United States Patent [19]

Fassbender

[11] Patent Number: 5,167,930

[45] Date of Patent: Dec. 1, 1992

[54] DUAL SHELL PRESSURE BALANCED VESSEL

[75] Inventor: Alexander G. Fassbender, West Richland, Wash.

[73] Assignee: Battelle Memorial Institute, Richland, Wash.

[21] Appl. No.: 870,746

[22] Filed: Apr. 20, 1992

Related U.S. Application Data

[63] Continuation of Ser. No. 617,736, Nov. 23, 1990, abandoned.

[51] Int. Cl.⁵ .................... G05D 16/00; F28D 21/00; B01J 3/00
[52] U.S. Cl. .................... 422/112; 422/202; 422/242; 422/307; 165/154
[58] Field of Search ............... 422/112, 242, 202, 208, 422/236, 237, 307; 165/154, DIG. 906

[56] References Cited

U.S. PATENT DOCUMENTS

| | | | |
|---|---|---|---|
| 2,114,238 | 4/1938 | Rabatel | 123/173 |
| 2,462,517 | 9/1942 | Leverenz | 252/301.6 |
| 2,865,615 | 12/1958 | Slaughter | |
| 2,997,435 | 8/1961 | Millar et al. | 204/193.2 |
| 3,079,993 | 3/1963 | Sweet | 165/94 |
| 3,282,459 | 11/1966 | Wilson | 220/3 |
| 3,515,520 | 6/1970 | Hervert | 23/290 |
| 3,554,707 | 1/1971 | Holmes et al. | 23/282 |
| 3,667,216 | 6/1972 | DeMattia, Jr. et al. | 60/37 |
| 5,027,971 | 7/1991 | Perryman | 220/426 |

FOREIGN PATENT DOCUMENTS

| | | | |
|---|---|---|---|
| 252128 | 12/1947 | Fed. Rep. of Germany | |
| 851356 | 10/1952 | Fed. Rep. of Germany | |
| 1542005 | 2/1966 | Fed. Rep. of Germany | |
| 2841900 | 7/1979 | Fed. Rep. of Germany | 422/242 |
| 3735767 | 7/1988 | Fed. Rep. of Germany | 422/242 |
| 9012914.8 | 11/1990 | Fed. Rep. of Germany | |
| 1446711 | 11/1966 | France | |
| 1566431 | 5/1969 | France | |
| 2092273 | 1/1972 | France | |
| 0157963 | 2/1963 | U.S.S.R. | 20/63 |
| 2033781 | 5/1980 | United Kingdom | 422/220 |

Primary Examiner—Robert J. Warden
Assistant Examiner—Christopher Y. Kim
Attorney, Agent, or Firm—Paul W. Zimmerman

[57] ABSTRACT

A dual-wall pressure balanced vessel for processing high viscosity slurries at high temperatures and pressures having an outer pressure vessel and an inner vessel with an annular space between the vessels pressurized at a pressure slightly less than or equivalent to the pressure within the inner vessel.

8 Claims, 4 Drawing Sheets

DUAL SHELL PRESSURE BALANCED VESSEL

CROSS REFERENCE TO RELATED APPLICATION

This application is a continuation of Ser. No. 07/617,736, filed Nov. 23, 1990, now abandoned.

FIELD OF THE INVENTION

The invention relates generally to the field of conversion of industrial wastes into useful products. More specifically, the invention relates to heat exchangers or reaction vessels used in conversion processes.

BACKGROUND OF THE INVENTION

Conversion of industrial wastes such as hazardous organic materials, sewage sludge, food processing by-products such as brewer's spent grain, and agricultural residues such as potato waste into useful products such as fuel or feedstock is increasing in importance. Newly developing conversion technologies require high performance heat exchangers and reaction vessels. Several biomass conversion technologies, described in U.S. Pat. No. 3,733,255 and in company literature of VerTech Treatment Systems, Denver, CO., process viscous slurries containing 5 to 35 percent solids, organic salts, and water at pressures of 1,000 to 5,000 psi and temperatures of 350 to 1000 degrees fahrenheit. Slurries having a low solids content or having solids which flow easily at ambient temperature can be moved through pipes by a pump. Slurries having a high solids content are usually difficult to move through pipes at ambient temperature. Sludges and slurries have a high Prandtl number, and viscosity of the slurries is also high at ambient temperatures. The high temperature and high pressure conditions are also usually corrosive. Heating such a slurry requires a scraped surface heat exchanger, which agitates the ambient temperature slurry in the heat exchanger, mixes the slurry and renews the surface film on the primary heat transfer surface, thereby overcoming the tendency of the slurry to stick to the heated surface. In addition, the heat exchanger must withstand corrosion, high temperature and pressure, and scraping.

Traditional heat exchanger design uses a single walled pressure vessel. A high pressure active seal is necessary to permit penetration of the rotating shaft of the scraper into the pressure vessel. These active seals operate by maintaining a thin film of water between rotating discs. A separate pump pressurizes the water film to a pressure greater than the operating pressure of the vessel to be sealed so that a continuous film of clean water leaks across the seal into the vessel. Few pressure vessel materials can meet all of the design requirements over the lifetime required for this type of heat exchanger, and active seals for this application cost from about $15,000 to about $25,000. In addition to their initial cost, inspection and maintenance of high pressure active seals is costly, and the performance and safety of this type of specially designed single-walled pressure vessel is difficult and expensive to assure.

All existing heat exchangers and reaction vessels used for thermochemical conversion of biomass have different pressures on the interior and exterior of the heat exchanger or reaction vessel, which necessitates the use of thick-walled pressure vessel and the use of a corrosion resistant material or a liner, and the use of active seals in cases where a scraper is needed.

It is therefore an object of the present invention to provide a dual-shell pressure balanced vessel capable of heating high Prandtl number sludges and slurries and capable of withstanding the high pressure and temperature operating conditions over the required life of the equipment.

It is a further object of the present invention to provide a dual-shell pressure balanced vessel that is inexpensive to construct yet efficiently accomplishes its purposes.

It is a further object of the present invention to provide a dual-shell pressure balanced vessel that is safe, and easy to operate and maintain.

It is a further object of the present invention to minimize the required thickness of corrosive resistant materials, and replace an active seal with a passive shaft seal where a scraper is needed.

It will be recognized that although the invention is directed toward industrial biomass waste conversion reaction vessels, it is applicable to any type of reactor or heat exchanger in which it is desired to have equal pressure on the interior and exterior of the heat exchanger or reaction vessel.

SUMMARY OF THE INVENTION

The present invention comprises a dual-shell pressure balanced vessel for converting industrial waste slurries into useful products. Pressure balance is used so as to remove the pressure load from an continuous flow inner vessel, which must withstand corrosion and high temperature, and remove most or all of the pressure load from shaft seals where a scraper is needed thereby allowing use of passive shaft seals. It is, of course, necessary to ensure that the temperature limit of the shaft seal material is not exceeded. Pressure balancing is achieved by providing dual shells, an outer shell or vessel, completely enveloping the continuous flow inner vessel. The annular space between the vessels is pressurized to a level equivalent to the pressure within the continuous flow inner vessel preferably with an inert fluid, incompressible (liquid) or compressible (gas). The continuous flow inner vessel containing the slurry to be heated may be provided with a scraping device for mixing the slurry, and is exposed to high temperature, corrosion, and scraping but isolated from exposure to large pressure differences across the wall of the inner vessel. The outer vessel is exposed to the high pressure of the system, but is isolated from the high temperature, corrosion, and scraping thereby allowing construction with a low cost material. The rotating shaft of the scraping device is aligned coincident with a longitudinal axis of the continuous flow inner reaction vessel and must penetrate the continuous flow inner vessel so as to place the motor in a benign environment outside the continuous flow inner vessel. However, the shaft seal and the continuous flow inner vessel will experience very little differential pressure since the pressure of the slurry is matched by the inert fluid pressure in the annular space. Temperature isolation of the outer vessel is achieved by placing insulation in the annular space along with the inert fluid. The slurry may be heated with electricity, steam, exothermic chemical reactions, or other means, or a combination of means.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 2A is a plan view of a slide mechanism;

DESCRIPTION OF THE PREFERRED EMBODIMENTS

Figure 1:
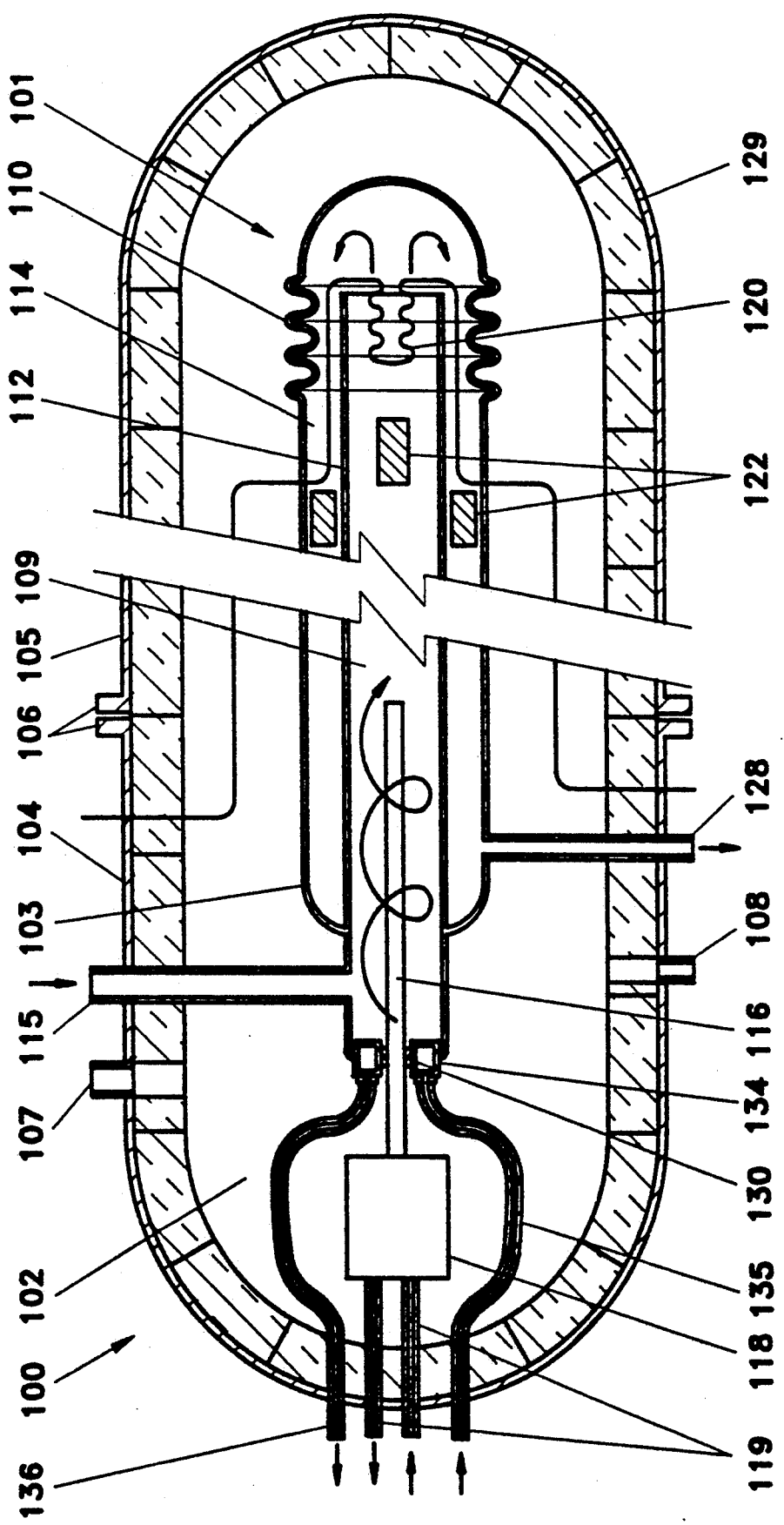
FIG. 1 is a longitudinal section view of a first embodiment of a double pass dual-shell pressure balanced vessel using an incompressible fluid.

In the preferred embodiment illustrated in FIG. 1, the dual-shell pressure balanced vessel is provided with an outer vessel (100) completely enveloping and continuous flow an inner vessel (101) containing an incompressible fluid, for example a slurry having a high solids content. The vessels are sized to provide an annular space (102) between the continuous flow inner vessel outer wall (103) and the outer vessel (100). The outer vessel (100) may be provided in two portions (104, 105) secured at a flange (106), permitting disassembly of the outer vessel and maintenance or removal of the continuous flow inner vessel (101). The outer vessel (100) further is provided with a fill port (107) and a drain port (108) for filling and draining fluid from the annular space (102). The annular space (102) is pressurized with an inert fluid to a pressure substantially the same as the pressure within a central space (109) of the continuous flow inner vessel (101). The inert fluid may be incompressible or compressible in the preferred embodiment.

In the case where the inert fluid is a liquid and incompressible or nearly incompressible, the continuous flow inner vessel (101) is constructed so as to be able to expand or contract, Use of an expandable vessel isolates the annular space from the interior of the reaction vessel thereby preventing fluid communication such as mixing or contamination between the slurry in the continuous flow inner vessel (101) and the inert fluid in the outer vessel (100), but allows instant pressure equalization if there is a change in pressure of the slurry. Equalization can also be achieved using rupture disks, or pressure relief valves, but rupture discs and certain relief valves would have to be replaced, and they do not maintain isolation of the slurry from the inert fluid, nor do they provide the constant equalization needed for long term operation.

Figure 2:
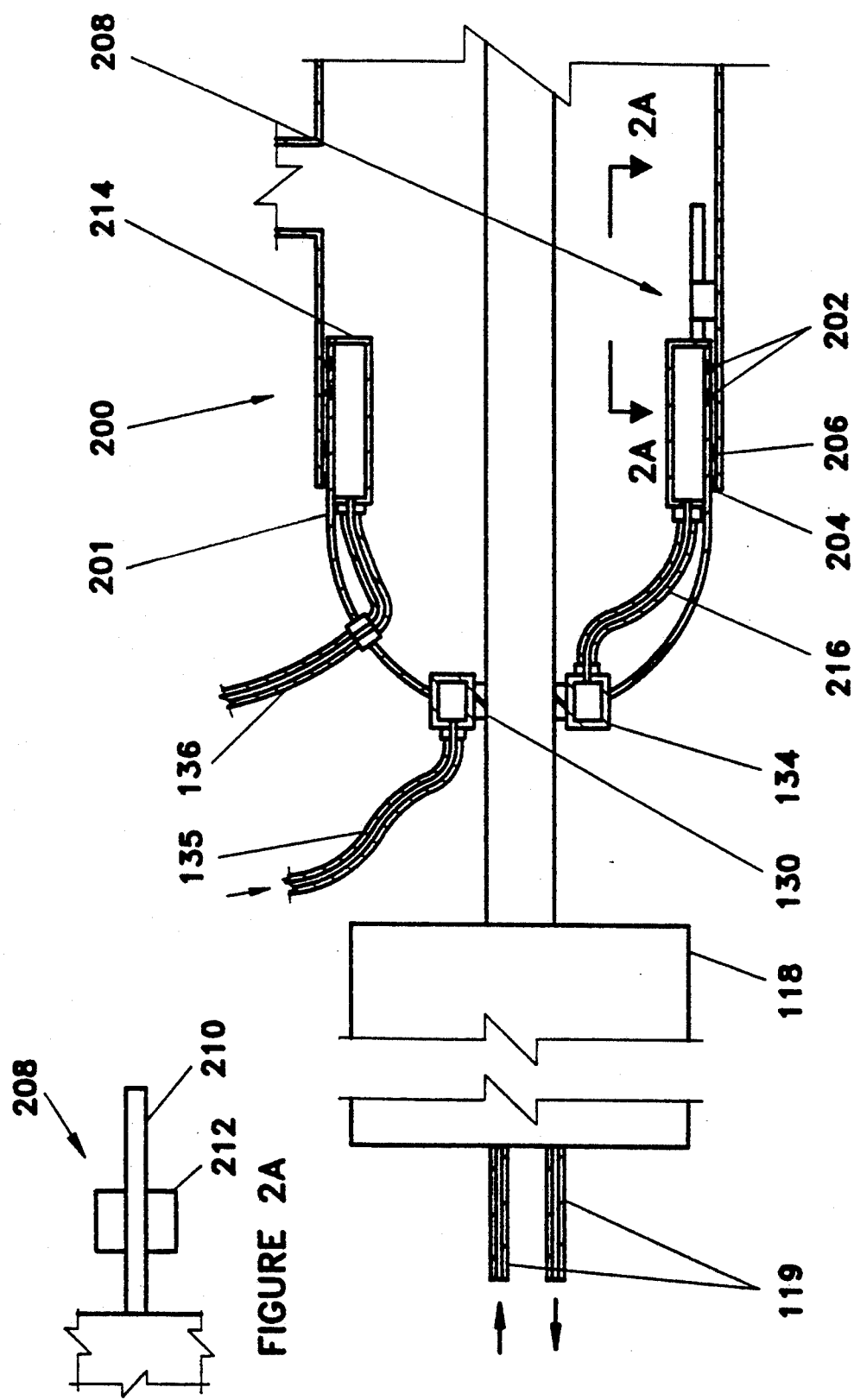
FIG. 2 is a partial longitudinal section view of a telescoping end for an incompressible inert fluid.

Pressure equalization between the interior of the continuous flow inner vessel (101) and the annular space (102) is accomplished with an incompressible fluid by having a means for expanding the inner vessel along its longitudinal axis. Such means may, for example, comprise a bellows (110) (as illustrated in FIG. 1) or a telescoping end (200) as illustrated in FIG. 2. When a bellows (110 continuous flow inner vessel) is used, it is preferred to avoid transverse loads. Such transverse loads are avoided by placing the bellows (110) on an end of the continuous flow inner vessel (101) surrounded by a first portion (105) of the outer vessel (100). When a telescoping end (200) is used, it is preferred to avoid high temperatures. Lower temperatures are achieved by placing the telescoping end at the inlet end of the continuous flow inner vessel (101) which is surrounded by a second portion (104) of the outer vessel (100).

The telescoping end (200) of FIG. 2 comprises a separate inner vessel end cap (201) fitted with O-Rings (202) to seal the inner vessel and allow the end cap to slide longitudinally within the inner vessel wall (103) in response to changes in pressure experienced during normal operation of the dualshell pressure balanced vessel. The telescoping end may be provided with stop rings (204) and (206) to prevent the vessel end cap (201 continuous flow inner vessel) from disengaging from the inner vessel wall (103).

The telescoping end (200) may further be provided with means to prevent rotation of the end cap (201). In a preferred embodiment, a slide assembly (208) having a slide bar (210) is attached to vessel end cap (201) and slidable within grooved slideblock (212). The slide bar may have any cross sectional shape. Other means to prevent rotation may be used.

In operation, pressure equalization of the annular space (102) is accomplished by allowing the continuous flow inner vessel expansion means to expand or contract in response to the pressure within the continuous flow inner vessel (101). Since the inner vessel expansion means is in contact with both the slurry (on its interior) and the inert fluid (on its exterior), a change in pressure of the slurry causes the inner vessel to expand or contract resulting in an immediate change in the pressure of the inert fluid. Any pressure gradient across the outer wall of the continuous flow inner vessel (101) is thereby minimized. The inert fluid is viscous and thereby minimizes convective heat losses. In addition, the thermal expansion and chemical characteristics of the fluid are selected to be chemically and thermally compatible with the materials used for both the inner and outer vessels to minimize damage by corrosion, or overpressure conditions.

In the case where the inert fluid is compressible such as a gas, the continuous flow inner vessel (101) would not be expandable but would be designed to withstand modest pressure differentials between the slurry and the inert gas. the inert gas would be kept at a pressure equal to or less than the slurry pressure, thereby providing pressure equalization without exposing a thin walled continuous flow inner vessel (101) to a reverse pressure differential where the external pressure on the continuous flow inner vessel (101) would be greater than the internal pressure.

Figure 3:
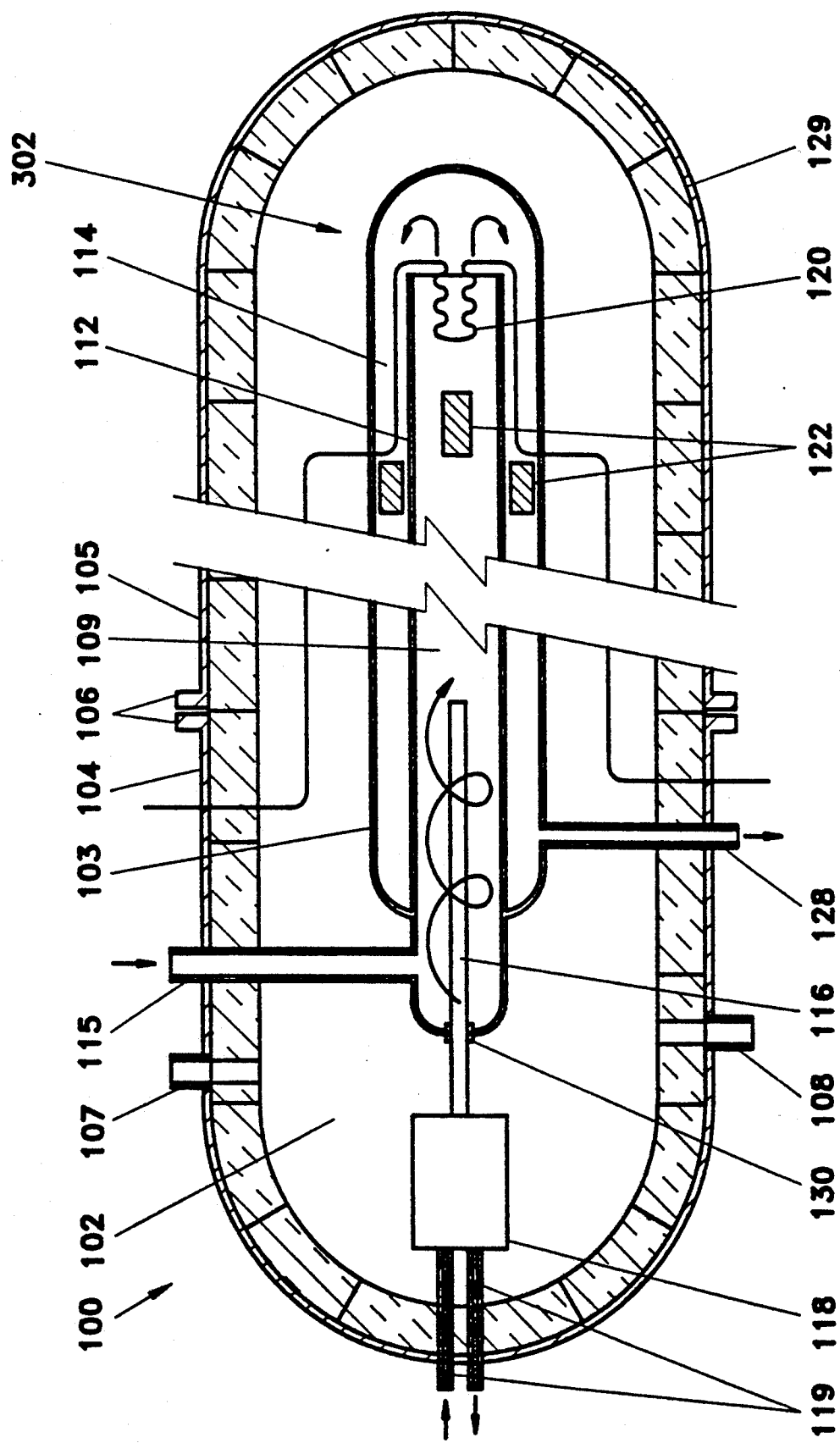
FIG. 3 is a longitudinal section view of a second embodiment of a double pass dual-shell pressure balanced vessel using a compressible fluid.

Pressure equalization between the interior of the continuous flow inner vessel (101) and the annular space is accomplished as shown in FIG. 3 with a compressible fluid by having a non-expandable continuous flow inner vessel (302 continuous flow inner vessel) and a port (107) for attaching a means for controlling the pressure of the compressible fluid to be substantially equal to or less than the pressure of the slurry in the interior of the continuous flow inner vessel (302). The means for controlling the pressure of the compressible fluid within annular space (102) can be a standard high pressure source of inert gas regulated by dome loaded back pressure control valves where the loading is provided by the slurry pressure. Other types of control systems such as computer control systems may be used as well.

In a dual pass continuous flow inner vessel (101) as shown in FIG. 1 or a dual pass continuous flow inner vessel (302) as shown in FIG. 3, the inner vessel has a pair of concentric walls (103, 112) forming a central space (109) and an annulus (114). The slurry to be heated enters the central space (109) through an inlet conduit (115) extending through the outer vessel (100). Upon entering the central space (109), the slurry is agitated by a scraper (116) rotated by a motor (118) powered by leads (119). The agitation ensures uniform heating of the slurry and prevents it from sticking to the heated surface as the slurry moves longitudinally through the central space (109) in the direction of the arrow, toward the heating unit (120). When the slurry is heated above a certain temperature, its viscosity and Prandtl number are sufficiently low that it will flow and mix without the aid of the scraper. The heated slurry flows from the central space (109) into the annulus (114) of the inner vessel in counter flow to the slurry in the central space (109) and gives up heat to the cooler slurry in the central space. If necessary for the conversion of the slurry into useful product, catalyst material (122) which, for example, may comprise rare earth and transition metals on a metal oxide support, may be placed in either or both of the central space or annulus of the continuous flow inner vessel. The wall (112) forming the central space (109) may be provided with fins extending into the annulus (114), or other conventional heat transfer enhancing means. The heated and converted slurry product is discharged through outlet (128).

The outer vessel (100) may be constructed of carbon steel which offers the advantages of low material cost and the ability to weld without post weld annealing, which is necessary on certain alloy materials. The inner vessel may be constructed of a thin walled corrosion resistant material. Since the pressure is equalized on the interior and exterior of the continuous flow inner vessel, the wall thickness of the corrosion resistant material can be minimized reducing cost and enhancing heat transfer.

Whether dual-pass, single pass, or the fluid in the annular space (102) is compressible or incompressible, operation and maintenance of the reaction vessel are facilitated by placing all connections on one side of a flange on the outer vessel allowing the other side to be easily removed. In addition, sensors may be placed within the reaction vessel to provide early warning of any leaks in the continuous flow inner vessel wall.

The annular space (102) may also contain insulation (129) such as refractory brick in addition to the inert fluid to isolate the outer vessel from exposure to high temperature.

The preferred scraping means comprises a motor (118) with power leads (119) and a scraper (116) aligned longitudinally along the axis of the continuous flow inner vessel (101) with the scraper shaft penetrating the inner vessel through a shaft seal (130). The preferred motor is a hydraulic motor to avoid the speed reduction and heat removal necessary for electric motors. The preferred shaft seal (130) is a low pressure seal such as are made from rubber or elastomer materials.

Slurry heating means (120) can be internal or external to the inner vessel and may comprise, for example, an electric resistance coil, steam jacket or coil, steam injection, an exothermic chemical reaction jacket or coil, or any combination of heating means. The preferred embodiment employs heat from an exothermic chemical reaction used for the conversion process in the annulus (114) and has either steam or electric backup.

Figure 4:
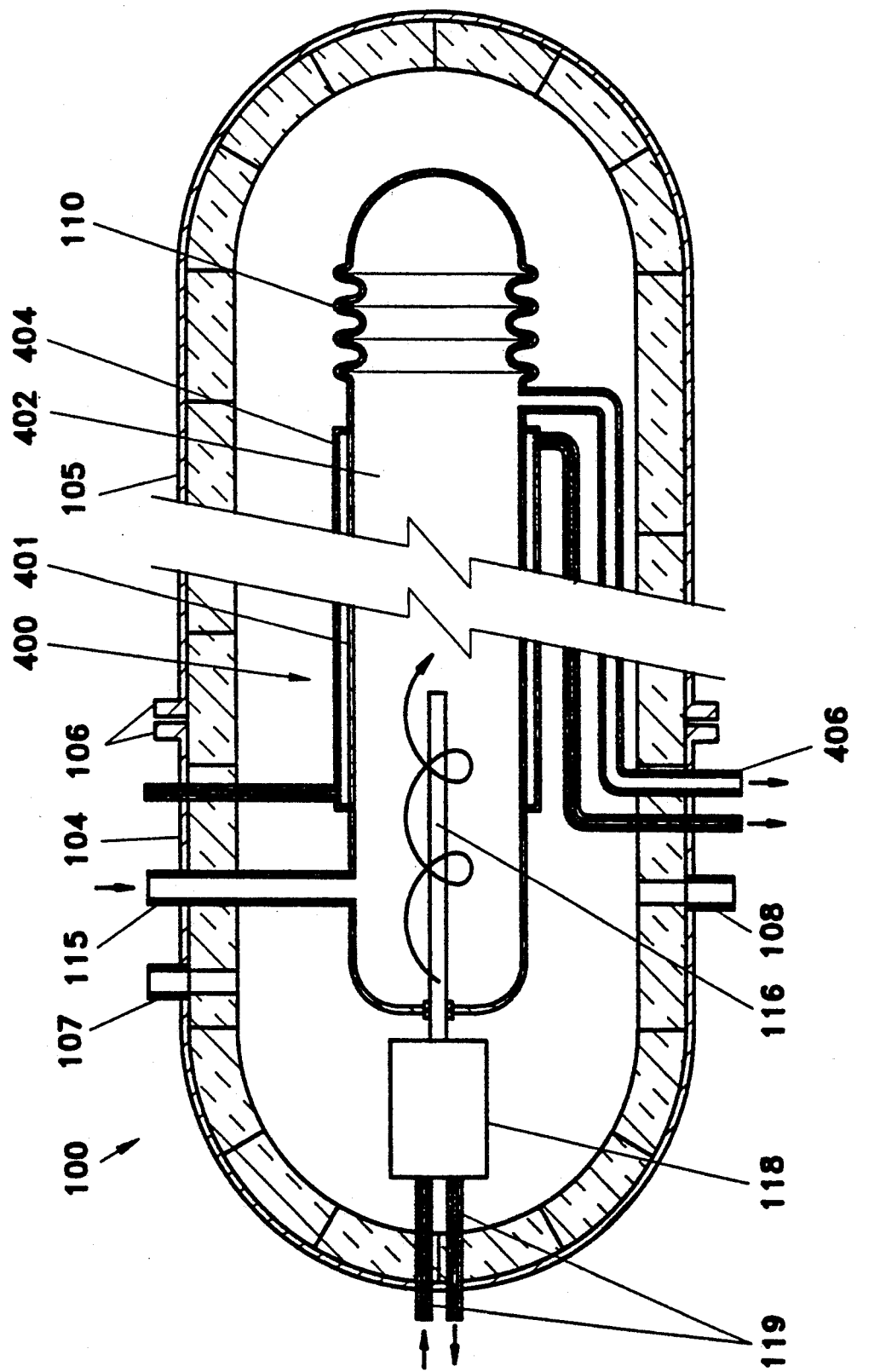
FIG. 4 is a longitudinal section view of a third embodiment of a single pass dual-shell pressure balanced vessel using an incompressible fluid.

In a single pass vessel as shown in FIG. 4, the device is constructed in much the same manner as in the first embodiment (FIG. 1) except that the continuous flow inner vessel (400) is a single vessel defined by a wall (401) forming a cylindrical space (402), with heating means (404) jacketing the inner vessel. Because the slurry makes a single pass through the continuous flow inner vessel (400) in this embodiment, slurry outlet (406) is routed to the same end as the slurry inlet (115) to facilitate removal of a second portion (105) of the outer vessel (100 continuous flow inner vessel).

Use of a hydraulic motor in the preferred embodiment has the advantage that the hydraulic fluid can be used to both protect the shaft seal and O-Rings from high temperatures as well as power the motor. In the embodiments of FIGS. 1 and 2, first cooling chamber (134) is mounted on the inlet end of the continuous flow inner vessel. The shaft seal (130) is mounted within the first cooling chamber (134). In FIG. 1, first hydraulic hose (135) routes the hydraulic fluid to the first cooling chamber and a second hydraulic hose (136) routes fluid from the first cooling chamber. Where O-Rings are used in a telescoping end (FIG. 2), a second cooling chamber (214) may be added with hydraulic hose (216) connecting the second cooling chamber to the first cooling chamber. In this arrangement, the second hydraulic hose (136) routes the hydraulic fluid from the second cooling chamber (214). If another type of motor is used, such as an electric motor, water or other coolant could be substituted for the hydraulic fluid for cooling purposes. In a vessel with compressible fluid, the shaft seal may be cooled passively by radiative cooling or by a conduction path between the shaft seal and the outer vessel.

In each of the embodiments disclosed herein, the fluid in the annular space (102) may be an inert gas or a liquid. It will be appreciated that the invention is not restricted to the particular embodiments that have been described, and that variations may be made therein without departing from the scope of the invention as defined in the following claims.

We claim:

1. A dual-shell pressure balanced vessel, comprising:
   an outer vessel completely enveloping a continuous flow inner vessel with an annular space therebetween, said inner vessel having an inlet and an outlet penetrating through the annular space and the outer vessel, said continues flow inner vessel containing a fluid pressurized to a first pressure, said annular space having a fluid pressurized to a second pressure, and
   a means for equalizing said first and second pressures wherein the second pressure in the annular space results from the first pressure in the continuous flow inner vessel while preventing mixing of said first and second fluids.

2. A dual-shell pressure balanced vessel as recited in claim 1, wherein the means for equalizing said first and second pressures comprises:
   a means for expanding or contracting the continuous flow inner vessel, said means being responsive to a difference between said first and second pressures and providing sufficient expansion or contraction permitting said first and second pressures to be substantially equivalent, thereby creating a balanced pressure across a wall of said continuous flow inner vessel.

3. A dual-shell pressure balanced vessel as recited in claim 2, further comprising:
   (a) a means for scraping the inner surface of the continuous flow inner vessel and for moving a slurry therethrough, and
   (b) a means for heating the slurry in the continuous flow inner vessel.

4. A dual-shell pressure balanced vessel as recited in claim 3, wherein said means for scraping comprises:
   (a) a motor,
   (b) a shaft driven by the motor and extending into said continuous flow inner vessel said shaft having means for scraping the inner surface of said continuous flow inner vessel,
   (c) a shaft seal provided between said shaft and said continuous flow inner vessel, and
   (d) a first cooling chamber surrounding said shaft seal.

5. A dual-shell pressure balanced vessel as recited in claim 4, wherein the means for expanding the continuous flow inner vessel, comprises:
   a bellows.

6. A dual-shell pressure balanced vessel as recited in claim 4, wherein the means for expanding the continuous flow inner vessel, comprises:
   a telescoping seal comprising a separate vessel end-cap with O-rings longitudinally slidable within the continuous flow inner vessel.

7. A dual-shell pressure balanced vessel as recited in claim 6, further comprising:
   a second cooling chamber mounted on an inside surface of the continuous flow inner vessel end cap opposite the O-rings for cooling said O-rings.

8. A dual-shell pressure balanced vessel as recited in claim 1, wherein said means for equalizing said first and second pressures comprises:
   (a) a compressible fluid in said annular space, and
   (b) a port in said outer vessel for controlling the pressure of said compressible fluid.

* * * * *

UNITED STATES PATENT AND TRADEMARK OFFICE
CERTIFICATE OF CORRECTION

PATENT NO. : 5,167,930
DATED : December 1, 1992
INVENTOR(S) : A. G. Fassbender

It is certified that error appears in the above-indentified patent and that said Letters Patent is hereby corrected as shown below:

Column 6, claim 1, line 49,
    change "continues" to --continuous--.

Column 8, claim 5, line 2,
    change the dependency from "claim 4" to --claim 2--.

Column 8, claim 6, line 6,
    change the dependency from "claim 4" to --claim 2--.

On title page, item [54],
    change "DUAL SHELL" to "DUAL-SHELL".

Column 1, line 1,    change "DUAL SHELL" to "DUAL-SHELL".

Column 3, line 63, change "(110 continuous flow inner vessel)" to
    --(110)--

Column 4, line 11,    change "dualshell" to --dual-shell--.

Column 4, line 56, change "(302 continuous flow inner vessel)" to
    --(302)--

UNITED STATES PATENT AND TRADEMARK OFFICE
CERTIFICATE OF CORRECTION

PATENT NO. : 5,167,930           Page 2 of 2
DATED      : December 1, 1992
INVENTOR(S): A. G. Fassbender It is certified that error appears in the above-indentified patent and that said Letters Patent is hereby corrected as shown below:

Column 6, line 11, change "(100 continuous flow inner vessel)" to --(100)--

Signed and Sealed this

Twenty-second Day of March, 1994

*Attest:*

BRUCE LEHMAN

*Attesting Officer*     Commissioner of Patents and Trademarks